United States Patent [19]

Dominguez

[11] 4,273,884
[45] Jun. 16, 1981

[54] STABLE EMULSIONS OF POLYOLS AND CROSSLINKERS FOR POLYURETHANES

[75] Inventor: Richard J. G. Dominguez, Austin, Tex.

[73] Assignee: Texaco Inc., White Plains, N.Y.

[21] Appl. No.: 149,287

[22] Filed: May 12, 1980

[51] Int. Cl.³ .............................................. C08G 18/14
[52] U.S. Cl. .................................. 521/114; 521/116; 521/174; 521/914; 528/48; 528/76; 528/405; 528/421
[58] Field of Search ................ 252/182; 521/114, 116, 521/174, 914; 528/48, 76, 405, 421

[56] References Cited

U.S. PATENT DOCUMENTS

| | | | |
|---|---|---|---|
| 3,328,320 | 6/1967 | Lord | 521/914 |
| 3,489,698 | 1/1970 | Morehouse | 521/174 |
| 3,546,145 | 12/1970 | Granger et al. | 521/174 |
| 3,857,800 | 12/1974 | Fishbein et al. | 521/914 |
| 3,945,939 | 3/1976 | Barron | 521/174 |

*Primary Examiner*—Maurice J. Welsh
*Attorney, Agent, or Firm*—Carl G. Ries; Robert A. Kulason; Kenneth R. Priem

[57] ABSTRACT

A stable emulsion of a high molecular weight polyol and either ethylene glycol or 1,4-butane diol is made by adding to the mixture an ethylene oxide/propylene oxide copolymer diol having an average molecular weight of above about 12,000 and an ethylene oxide content of from about 70% to 90%. The stable emulsion is useful as a reactant in RIM polyurethane plastics.

7 Claims, No Drawings

STABLE EMULSIONS OF POLYOLS AND CROSSLINKERS FOR POLYURETHANES

BACKGROUND OF THE INVENTION

1. Field of the Invention

The invention concerns the field of reaction injection molded polyurethanes (RIM).

2. Description of the Prior Art

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. These active hydrogen containing materials comprise a high molecular weight polyhydric polyether and a low molecular weight active hydrogen containing compound. In the invention to be described below, the low molecular weight active hydrogen containing compounds are either ethylene glycol or 1,4-butane diol. Generally, the active hydrogen containing materials, both high and low molecular weight, are mixed together with catalyst and other optional materials in one tank and the polyisocyanate is contained in another tank. When these two streams are brought together in a mold, the RIM part is made. One problem with prior art processes is that the high molecular weight polyhydric polyether and the ethylene glycol or 1,4-butane diol are incompatible and will not form a stable emulsion. This leads to processing difficulties since a stable emulsion is necessary for a consistently uniform RIM part to be made.

U.S. Pat. No. 3,489,698 describes a prior art system wherein a high molecular weight polyol having a hydroxyl number range of 56 to 34 and a low molecular weight polyol having a hydroxyl number range of from 420 to about 650 was used. These materials of differing molecular weights were found to be incompatible and block copolymers of ethylene and propylene oxide ranging in molecular weights from 5,000 to about 27,000 and having functionalities of 2 or 3 were used to stabilize these emulsions of 2 polyols. In a paper given in 1974 by the same assignee of the above U.S. patent (Union Carbide Corporation), "*Plastics in Surface Transportation*", National Technical Conference, Society of Plastics Engineers, 1974, pp. 64–68, a complex system is offered wherein a 6,000 molecular weight polyol was made into a stable emulsion with ethylene glycol by the use of a di-ethylene oxide adduct of aniline and approximately equal weight ratios with the ethylene glycol. The resulting mixture of ethylene glycol and the di-ethylene oxide adduct of aniline was compatible with the high molecular weight polyol.

It has been surprisingly discovered that a much simpler and direct route to compatibility of ethylene glycol and 1,4-butane diol with high molecular weight polyols may be achieved by the use of particular high molecular weight ethylene oxide/propylene oxide copolymer diols having a high content of ethylene oxide.

SUMMARY OF THE INVENTION

The invention is an emulsion of a high molecular weight polyol having a hydroxyl number of from about 56 to 24 and ethylene glycol or 1,4-butane diol using an amount of emulsifier comprising an ethylene oxide/propylene oxide block copolymer diol having an average molecular weight of above about 12,000 and an ethylene oxide content of about 70% to about 90% effective for forming a stable emulsion.

DESCRIPTION OF THE PREFERRED EMBODIMENTS

The polyols useful in the RIM elastomers of this invention include polyether polyols, polyester diols, triols, tetrols, etc., having an equivalent weight of from about 1,000 to about 3,000. Those polyether polyols based on trihydric initiators which have hydroxyl numbers ranging from about 56 to about 24 are especially preferred. The polyethers may be prepared from lower alkylene oxides such as ethylene oxide, propylene oxide, butylene oxide or mixtures of propylene, butylene and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application.

The chain-extenders useful in this invention are ethylene glycol and 1,4-butane diol.

The emulsifier which is useful in forming a stable emulsion of the polyols and the ethylene glycol are 1,4-butane diol chain extender is an ethylene oxide/propylene oxide copolymer diol having an average molecular weight of above about 12,000 and an ethylene oxide content of from about 70% to about 90%. A particularly preferred material useful as an emulsifier is PLURONIC®F-98 which has an average molecular weight of 13,500 and is an ethylene oxide/propylene oxide copolymer diol having about 80% ethylene oxide groups. As will be shown by the examples which follow, low molecular weight ethylene oxide/propylene oxide copolymer diols do not render the emulsions between ethylene glycol or 1,4-butane diol and high molecular weight polyols stable.

The amount of emulsifier needed is that amount which is effective for forming a stable emulsion of the polyol and either ethylene glycol or 1,4-butane diol. The effective amount will vary depending on the polyol used. Generally, however, it is recommended that from about 0.1 to 10 weight % of the emulsifier be used based on the polyol amount. It is preferred to use from about 0.1 to 5% based on the polyol.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis-(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4′-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

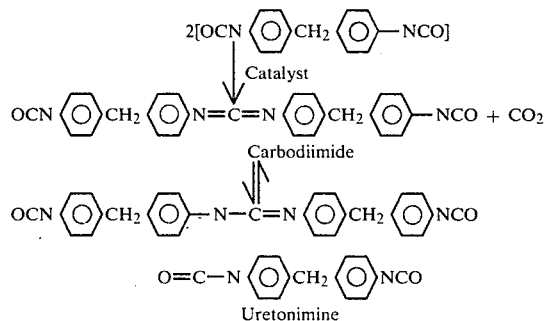

Examples of commercial materials of this type are Upjohn's ISONATE ®125M (pure MDI) and ISONATE ®143L ("liquid" MDI). Preferably the amount of isocyanates used is the stoichiometric amount based on all the ingredients in the formulation or greater than the stoichiometric amount.

Catalysts can be present to accelerate the reaction. Among those most frequently employed in this art are the amine catalysts and the organo metallic compounds. For example, trimethylamine, N-methylmorpholine, N,N,N′,N′-tetramethyl-1,3-butanediamine, 1,4-diazabicyclo[2.2.1]octane, dibutyltin dilaurate, stannous octoate, dioctyltin diacetate, lead octoate, lead naphthenate, lead oleate, etc. Also useful are other known catalysts such as the tertiary phosphines, the alkali and alkaline earth metal hydroxides or alkoxides, the acidic metal salts of strong acids, salts of various metals, etc. These catalysts are well known in the art and are employed in catalytic quantities, for example, from 0.001 percent to about 5 percent, based on the weight of the reaction mixture.

The RIM formulation includes a great number of other recognized ingredients such as additional crosslinkers, catalysts, extenders, blowing agents and the like. Blowing agents may include halogenated low-boiling hydrocarbons, such as trichloromonofluoromethane and methylene chloride, carbon dioxide, nitrogen, etc., used.

Other conventional formulation ingredients may also be employed, such as, for example, foam stabilizers, also known as silicone oils or emulsifiers. The foam stabilizer may be an organic silane or siloxane. For example, compounds may be used having the formula:

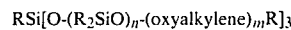

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

In a preferred embodiment of this invention, a high molecular weight polyether polyurethane polyol of about 6500 molecular weight having 50% primary hydroxyl capping is made into a stable emulsion with 18% ethylene glycol by using an emulsifier comprising an ethylene oxide/propylene oxide block copolymer diol having an average molecular weight of about 13,500 and an ethylene oxide content of about 80%. The stable emulsion is combined with 4,4′-diphenylmethane diisocyanate (MDI) and allowed to react in the presence of a catalyst system in a standard RIM machine having a closeable mold using known processing techniques. The molded RIM part is then postcured at a temperature above about 250° F. for about ½ hour. The invention may be exemplified by the following examples which are not intended to limit the scope of the invention.

EXAMPLE I

PLURONIC F-98 (of BASF Wyandotte) surfactant formed a stable polyol/ethylene glycol emulsion. The best results are obtained with THANOL ®SF6503 polyether polyol. However, improvements in emulsion stability were observed with THANOL SF 3950 and SF 5505 polyols. This work was done with a PLURONIC surfactant level of 0.3% by weight. PLURONIC F 68 was found to not work in this application.

EXAMPLE II

A study of 4 PLURONIC surfactants was made: PLURONIC F 98, F 88, F 87 and F 68. Emulsions of a 50/50 by weight blend of THANOL SF 6503 polyether polyol and ethylene glycol with 0.4% by weight surfactant were studied. PLURONIC F 98 (which is the highest molecular weight, highest ethylene oxide content surfactant of the series) was found to produce the most stable emulsions.

EXAMPLE III

This is the first use of PLURONIC F 98 stabilized emulsions in a RIM formulation. Plaques were molded on a low pressure Admiral machine. The formulation was as follows:

| B Component | | A Component | |
|---|---|---|---|
| THANOL SF 6503 | 64 pbw | FREON®R11B | 2.0 pbw |
| Ethylene glycol | 15 pbw | ISONATE® 143L | 77.41 pbw |
| PLURONIC F 98 | 0.2 pbw | | |
| THANCAT®TD-33 | 0.05 pbw | | |
| Dibutyltin dilaurate | 0.15 pbw | | |

The final elastomer has excellent properties and was easier to demold than the same formulation wihtout using PLURONIC F98.

EXAMPLE IV

A standard High Flexural Modulus RIM formulation is as follows:

| B Component | | A Component | |
|---|---|---|---|
| THANOL SF 5505 | 16 pbw | ISONATE 143L | 28.65 pbw |
| Ethylene glycol | 6.44 pbw | THANCAT Quasi-Prepolymer L55-0 | 5.56 pbw |
| L 5430 surfactant | 0.2 pbw | | |
| THANCAT DMDEE | 0.25 pbw | | |
| FOMREZ UL-29 | 0.025 pbw | | |
| Dibutyltin dilaurate | 0.015 pbw | | |

In this example, 0.2 pbw of the THANOL SF 5505 in the B-component was replaced with PLURONIC F 98. This made a fairly stable B-component (stable to separation of the ethylene glycol/polyol mixture) and the resulting RIM elastomer, made on a LRM II Cincinnati-Milacron RIM machine, had basically the same overall properties of the standard.

EXAMPLE V

When a little more of the THANOL SF 5505 polyol of the formulation of Example IV is replaced with PLURONIC F 98, a very stable (emulsion stable for 4-6 weeks) B-component was produced. In this Example, 0.7 pbw of the SF 5505 was replaced by PLURONIC F 98 in the B-component. The overall B-component had 3% PLURONIC F 98. The physical properties of this RIM elastomer are undistinguishable from the standard formulation in Example IV.

EXAMPLE VI

A standard RIM fascia formulation is as follows:

| B-Component | | A-Component | |
|---|---|---|---|
| THANOL SF-6503 | 100.0 pbw | ISONATE 143L | 97.05 pbw |
| Ethylene Glycol | 18.04 pbw | | |
| L5430 surfactant | 0.2 pbw | | |
| THANCAT TD33 | 0.05 pbw | | |
| FOMREZ T-12 | 0.15 pbw | | |
| FREON R11B | 2.0 pbw | | |

When the L5430 surfactant was substituted by PLURONIC F 98 in the B-component as follows:

| THANOL SF-6503 | 100.0 pbw |
|---|---|
| Ethylene Glycol | 18.04 pbw |
| PLURONIC F-98 | 1.22 pbw |
| THANCAT TD-33 | 0.05 pbw |
| FOMREZ T-12 | 0.15 pbw |
| FREON R11B | 2.0 pbw | the B-component was stable for 6-8 weeks with only minor evidences of separation. Also, the properties and processing of the material employing the new surfactants were much improved.

EXAMPLE VII

Six other PO/EO surfactants (shown below) were studied to see if they could be used in the place of PLURONIC F 98. These were all failures. Four of these materials were sucrose based surfactants (functionality=8). Two were pentaerythritol based materials (functionality approximately 4). Although some of these materials were in the molecular weight range of PLURONIC F 98 and had about the same ethylene oxide content, they did not work. The results of these studies indicate that if one wants stable ethylene glycol/polyether polyols emulsions one needs an ethylene oxide/propylene oxide block copolymer of sufficiently high molecular weight (above 12,000), sufficiently high ethylene oxide content (above 70% by weight) and functionality less than four (preferably difunctional) to act as a surfactant.

| Surfactant | MW | % by wt. E.O. | Functionality |
|---|---|---|---|
| A | 37,400 | 93 | 8 |
| B | 8,800 | 85 | 8 |
| C | 14,000 | 80 | 8 |
| D | 20,200 | 86 | 8 |
| E | 8,400 | 71 | 4 |
| F | 18,900 | 87 | 4 |

GLOSSARY OF TERMS AND MATERIALS

RIM—Reaction Injection Molding

Polyol—A di or greater functionality high molecular weight alcohol terminated molecule composed of ether groups such as ethylene, propylene, butylene, etc., oxides.

MDI—4,4' diphenyl methane diisocyanate

ISONATE 143L—Pure MDI isocyanate modified so that it is a liquid at temperatures where MDI crystallizes-product of the Upjohn Co.

Quasi-prepolymer L-55-0—A quasi-prepolymer formed by reacting equal weights of ISONATE 143L and THANOL SF-5505.

THANCAT®TD-33—33.3% triethylenediamine in propylene glycol solution.

THANOL SF-5505—a 5500 molecular weight polyether triol containing approximately 80% primary hydroxyl groups.

THANOL®SF-6503—a 6500 molecular weight polyether triol containing approximately 80% primary hydroxyl groups.

THANOL®SF-3950—a 4000 molecular weight polyether polyol containing about 80% primary hydroxyl groups.

L5430 Silicone Oil—A silicone glycol copolymer surfactant containing reactive hydroxyl groups. Product of Union Carbide.

FOMREZ UL-29—A stannic diester of a thiol acid (an alkyl tin mercaptide). The exact composition is unknown. Product of Witco Chemical Co.

PLURONIC®F-98—a 13,500 molecular weight polyether diol containing approximately 80% by weight ethylene oxide.

PLURONIC®F-68—a 8350 molecular weight polyether diol containing approximately 80% by weight ethylene oxide.

PLURONIC®F-87—a 7700 molecular weight polyether diol containing approximately 70% by weight ethylene oxide.

PLURONIC®F-88—a 10,800 molecular weight polyether diol, containing approximately 80% by weight ethylene oxide.

I claim:

1. An emulsion of a polyol having an hydroxy number of from about 56 to about 24 and ethylene glycol and an emulsifier comprising an ethylene oxide/propylene oxide block copolymer diol having an average molecular weight of above about 12,000 and an ethylene oxide content of from about 70% to about 90%.

2. An emulsion as in claim 1 wherein the polyol has an hydroxyl number of about 26.

3. An emulsion as in claim 1 wherein the emulsifier is an ethylene oxide/propylene oxide block copolymer diol having an average molecular weight of about 13,500 and an ethylene oxide content of about 80%.

4. An emulsion of a polyol having an hydroxy number of from about 56 to about 24 and 1,4-butane diol and an emulsifier comprising an ethylene oxide/propylene oxide block copolymer diol having an average molecular weight of above about 12,000 and an ethylene oxide content of from about 70% to about 90%.

5. An emulsion as in claim 4 wherein the polyol has an hydroxyl number of about 26.

6. An emulsion as in claim 4 wherein the emulsifier is an ethylene oxide/propylene oxide block copolymer diol having an average molecular weight of about 13,500 and an ethylene oxide content of about 80%.

7. In a method for making a RIM polyurethane product wherein a polyol, a chain extender comprising ethylene glycol and/or 1,4-butane diol and a polyisocyanate are reacted in a closable mold the improvement which comprises emulsifying the polyol and chain-extender with an effective amount of an ethylene oxide/propylene oxide block copolymer having an average molecular weight of above about 12,000 and an ethylene oxide content of from about 70% to about 90%.

* * * * *